May 7, 1946. L. CALDWELL 2,399,984
METHOD AND APPARATUS FOR THE GASEOUS REDUCTION
OF IRON OXIDE IN SUSPENSION
Filed Oct. 2, 1943
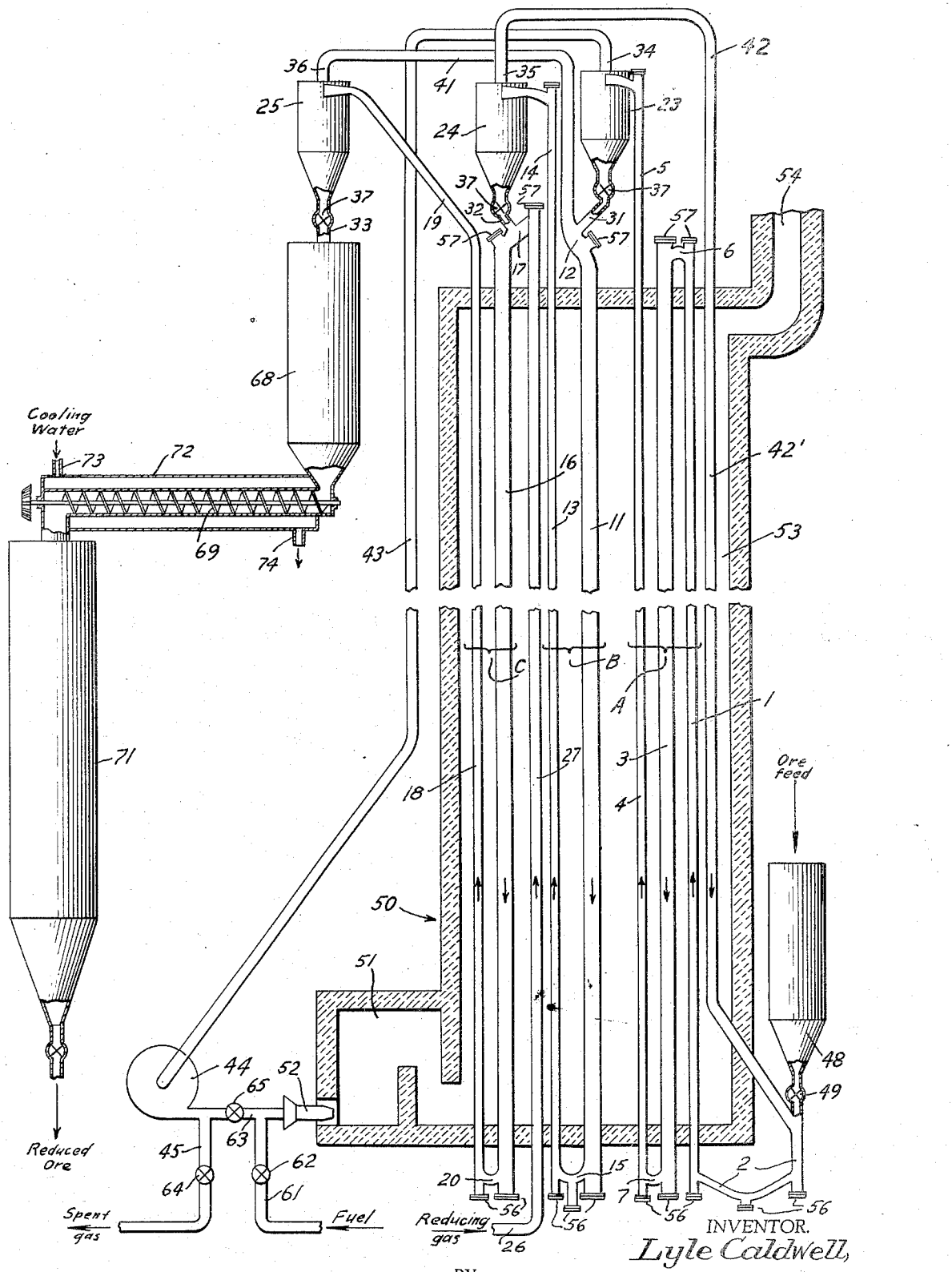
INVENTOR.
*Lyle Caldwell,*
BY
ATTORNEY.

Patented May 7, 1946

2,399,984

UNITED STATES PATENT OFFICE 2,399,984

METHOD AND APPARATUS FOR THE GASEOUS REDUCTION OF IRON OXIDE IN SUSPENSION

Lyle Caldwell, Los Angeles, Calif.

Application October 2, 1943, Serial No. 504,796

4 Claims. (Cl. 75—26)

This invention relates to the reduction of iron oxide by bringing an ore or other solid material containing iron oxide into contact with a reducing gas at elevated temperature.

In processes previously used for the reduction of iron oxide by means of a gaseous reducing agent, it has been impossible to obtain efficient utilization of the reducing gas and, at the same time, complete reduction of the iron oxide to the metallic state. It has been proposed to employ counter-current contact of the reducing gas with the solid iron oxide containing material, but in such procedures the solid material is usually in relatively coarse condition so as to permit the gas to flow through a moving or stationary bed of the material. Under these conditions, a long time of contact is required to effect the desired reduction of the iron oxide contained in the relatively large particles of solid material, and it is difficult, if not impossible, to effect complete and uniform reduction thereof.

In some cases, counter-current contact is obtained by allowing the material, in somewhat more finely divided condition, to fall freely by gravity through an ascending stream of the reducing gas. However, if the material is very finely divided, the velocity of gas flow must be kept quite low in order to prevent the material from being carried upward thereby, and the capacity of the apparatus is therefore very limited. On the other hand, if the particle size is increased in order to permit higher gas velocity, the above-mentioned disadvantages of treating large particles of material are encountered.

It has also been proposed to introduce the iron oxide containing material in finely divided condition into a stream of reducing gas, and cause the material to be carried along in suspension in the gas stream at elevated temperature to effect the reduction, but this does not provide the desired counter-current contact. As the reduction progresses, the partially oxidized gas becomes less and less effective for effecting further reduction. Hence, complete reduction becomes impossible or can be obtained only by the use of excessive quantities of reducing gas.

The principal object of the invention is to provide a highly advantageous and economical process and apparatus for the reduction of iron oxide in ores such as hematite ($Fe_2O_3$) or magnetite ($Fe_3O_4$), or in other solid materials containing iron oxide, whereby at least the major portion of the iron may be reduced to the metallic state.

A particular object of the invention is to provide a process and apparatus for reducing iron oxide by contact with a reducing gas at elevated temperature, with a high efficiency of utilization of the reducing gas, and with substantially complete reduction of the iron oxide.

A particular object is to obtain the advantages of both fine division of the iron oxide containing solid material and counter-current contact thereof with the reducing gas.

A further object is to provide a process and apparatus for the purpose stated above, in which the iron oxide containing material is reduced in suspension in the reducing gas and in which the gas moves vertically throughout the major portion of the contact period, in order to eliminate difficulties that would be experienced if it were attempted to carry out the contact in horizontal gas passages.

Other objects and advantages of the invention will be pointed out hereinafter or will be apparent from the following description. How these objects are accomplished may be best understood by reference to the accompanying drawing, which illustrates a preferred form of apparatus in accordance with my invention, and in which the process may be carried out.

The apparatus is shown as comprising three successive tubular reduction units indicated generally at A, B and C, each of which extends vertically throughout the major portion of its length and is provided with inlet means at one end and outlet means at the other end. Each of these units preferably comprises two or more vertically extending sections of metal tubing extending side by side and connected in series to provide for flow of gas therethrough in reverse directions in successive sections, the gas flow being either first upward and then downward, or first downward and then upward.

For example, unit A is shown as comprising an up-flow section 1 provided at its lower end with inlet means indicated generally at 2, a down-flow section 3, and an up-flow section 4 provided at its upper end with outlet means such as pipe 5. Short connecting pipes 6 and 7 connect together the upper ends of sections 1 and 3 and the lower ends of sections 3 and 4.

Units B and C are shown as comprising down-flow sections 11 and 16 provided at their upper ends with inlet means 12 and 17 respectively, and up-flow sections 13 and 18 provided at their upper ends with outlet means such as pipes 14 and 19 respectively. Short connecting pipes 15 and 20 connect together the lower ends of sections 11 and 13, and 16 and 18, respectively.

It will be understood, of course, that the specific arrangements of tube sections described above are merely illustrative, and that other arrangements may also be used in which the inlet and outlet means of the second units may be at either the upper or lower ends thereof.

The outlet pipes 5, 14 and 19 of the several reduction units are connected to separating devices 23, 24 and 25 respectively, each adapted to separate suspended solid material from gas. These separating devices are shown as dust separators of the well-known cyclone type, but it will be understood that any other suitable type of dust collectors or separators may be employed.

Pipe 26 is connected to any suitable source of reducing gas, for supplying such reducing gas to the system, and a tubular preheating unit 27 is preferably provided, connected at its lower end to pipe 26 and at its upper end to inlet means 17 of the last reduction unit C.

The gas outlet pipes 5, 14 and 19 deliver gas and suspended solid material from the units A, B and C to the respective separating devices, which are shown as provided with tangential inlets, with outlets 31, 32 and 33 at their lower ends for discharge of separated solid material and with outlets 34, 35 and 36 at their upper ends for discharge of gas from which the suspended solids have been largely or substantially completely separated. The dust discharge outlets 31, 32 and 33 are provided with rotary or other suitable type of gas-seal feeding valves, as indicated diagrammatically at 37, for delivering separated solid material downwardly therethrough while substantially preventing passage of gas therethrough.

The gas outlet 36 of the last separating device 25 is connected by pipe 41 to the inlet means 12 of the next preceding reduction unit B to deliver gas thereto. Similarly, pipe 42 delivers gas from the outlet 35 of separating device 24 to the inlet means 2 of the next preceding reduction unit A. A pipe 43 leads from the gas outlet 34 of the first separating device 23, for carrying off the spent reducing gas from the reduction system. I have shown pipe 43 connected to a blower 44 whereby the reducing gas is drawn through the several units. The entire system may be kept under any suitable condition of pressure, and it will be understood that the blower may, if desired, be located in the inlet pipe 26 or at any other suitable point in the system. The discharge side of blower 44 is shown as connected to pipe 45 through which the gas may be delivered to any suitable point of disposal or further use.

Feed bin 48 is provided with a rotary or other suiable type of gas-seal feeding valve 49 for delivering divided solid material downwardly therethrough while substantially preventing passage of gas. Said feeding valve serves to introduce finely divided material containing iron oxide, preferably continuously, into the inlet means 2 of the first reduction unit A.

Separated solid material from the first separating device 23 is delivered through outlet 31 to the inlet means 12 of the next succeeding reduction unit B. Similarly, separated solid material from the second separating device 24 is delivered through outlet 32 to the inlet means 17 of the next succeeding separating unit C.

For the purpose of supplying heat to the several reduction units to heat the gas and suspended solid material passing therethrough, I prefer to provide a furnace 50 of suitable construction, having a combustion chamber 51 provided with a burner 52, a heating chamber 53 through which pass the hot combustion gases from chamber 51, and a stack 54. The vertically extending sections 1, 3, 4, 11, 13, 16 and 18 of the several tubular reduction units extend, for the major portion of their length, within heating chamber 53. If desired, the reduction units A, B and C could be disposed entirely within said heating chamber, but I have shown said units as extending a short distance outside the furnace at their upper and lower ends, in order to provide convenient access for clean-out or other purposes. Also, to permit access to the interior of the vertical tubing sections for cleaning or other purposes, I have shown suitable removable cap members secured thereto at suitable positions at or adjacent their lower ends (as indicated, for example, at 56) and/or their upper ends (as indicated, for example, at 57).

The gas preheating unit 27 is shown as extending within heating chamber 53 for preheating the incoming reducing gas, whereby furnace 50 serves to provide all the heat required for the reduction process including the preheating of the reducing gas to the desired reaction temperature and the maintenance of the gas and suspended solids at such temperature. I have also shown pipe 42 extending through heating chamber 53, as indicated at 42', so as to provide for supplying additional heat to the gas passing therethrough.

Fuel supply pipe 61 provided with valve 62 is connected to burner 52 for supplying gas, liquid or solid fuel thereto. The spent reducing gas will ordinarily contain combustible constituents, as brought out hereinafter in the description of the process. If desired, these gases may be delivered from blower 44 to burner 52, through pipe 63, to provide fuel for furnace 50. Pipes 45 and 63 are provided with valves 64 and 65 for controlling flow of gas therethrough from blower 44.

It will be understood that the portions of the above described reduction system that are located outside the furnace, such as the upper and lower end portions of the tubular reduction units A, B and C, the separating devices 23, 24 and 25, and the pipes connecting these elements of the system for conducting gas and/or solid material through the system, are preferably covered with suitable heat insulation in order to prevent excessive loss of heat therefrom.

Also, it will be understood that each of the vertically extending tube sections of the several reduction units A, B and C, as well as preheating unit 27, may comprise a plurality of tubes connected in parallel, which may extend within a common heating chamber and may be connected, if desired, to common separating devices for separation of the suspended solid material.

It is important that the reduced metallic iron delivered from the last separating device 25 be cooled to relatively low temperature before it is permitted to come in contact with air or other oxidizing medium, in order to prevent re-oxidation thereof. For this purpose, I have shown a collecting chamber 68 connected to the outlet 33, to receive the separated solid material from said separating device, and a cooling device in the form of a water-jacketed screw-conveyer 69 through which the collected material is delivered from chamber 68 into a storage chamber 71. Cooling jacket 72 is provided with an inlet 73 and an outlet 74, whereby water or any other desired cooling medium may be passed therethrough.

The invention is particularly useful for the reduction of iron oxide in ores containing one or more oxides of iron, such as hematite ($Fe_2O_3$) or magnetite ($Fe_3O_4$), associated with gangue material, and the process will therefore be described as applied to such an ore, although it may be applied in similar manner to the treatment of any solid material containing iron oxide.

The ore is delivered to feed bin 48 in powdered or finely divided condition, that is, in the form of particles sufficiently small to be carried in suspension in a stream of reducing gas at moderately high velocity. In general, the ore should be ground to a fineness of about 100 mesh or finer, and preferably about 150 mesh or finer, it being understood that grinding until, say, 90% or 95% of the material is reduced to this fineness may be sufficient in some cases.

The ore is also preferably dried substantially completely before being introduced into the process, in order to avoid diluting the reducing gas with water vapor that would otherwise be formed by evaporation upon contact with the hot gas.

The furnace is fired and brought up to the desired elevated temperature, and reducing gas is introduced at 26 to produce a flow of such gas through the system as described more fully hereinafter, at sufficient velocity to carry the divided solid material in suspension. Any desired reducing gas may be used, such as hydrogen, carbon monoxide, or hydrocarbon gas, or natural or artificial gaseous products containing one or more such gases. For example, I may use natural gas, consisting principally of methane and other hydrocarbon gases; hydrocarbon vapors produced by heating and/or cracking of liquid hydrocarbons; producer gas; or other artificially produced gas containing carbon monoxide, hydrogen and/or hydrocarbons.

The finely divided ore is first introduced through feed valve 49 and dispersed in the gas flowing downward from pipe 42 through inlet means 2, so as to be carried along in suspension in the gas through the first reduction unit A in a first reduction stage. In this unit, the gas and suspended solids pass first upward in tube section 1, then downward in section 3, and finally upward in section 4, whence they are delivered through outlet means 5 to the first separating device 23 to separate the partly reduced solid material from the gas.

The separated solids from separating device 23 are then delivered through the feed valve 37 thereof into inlet means 12 where they are dispersed in the gas entering the next succeeding unit B and are again carried in suspension through that unit, first downward in section 11 and then upward in section 13. The gas and suspended solids from this second reduction stage are delivered through outlet means 14 to the second separating device 24, where the solids, in a further reduced state, are again separated from the gas.

The separated solids are then similarly introduced into inlet means 17 and dispersed in the gas entering the third reduction unit C and are again carried in suspension, first downward in section 16 and then upward in section 18. The gas and suspended solids from this stage are then delivered to the third separator 25 in which the solid particles containing the iron in its finally reduced state are separate from the gas and discharged from the system.

The reduction of the iron oxide to ferrous oxide (FeO), and finally to the metallic state, occurs progressively in the successive stages, due to contact and reaction with the hot reducing gas. The ore is subjected to treatment in successive stages in units A, B and C, while the gas passes through the several units in reverse order. The fresh reducing gas passes first through the preheating tube 27 where it is heated to the desired temperature, and is then introduced first into the last stage in reduction unit C. After leaving that stage it is then delivered from separating device 25 through pipe 41 into the next preceding stage in unit B, whence it is in turn delivered from separator 24 through pipe 42 (including heating section 42') into the first stage. The gas leaving the first stage is finally delivered from separator 23 through pipe 43 to blower 44, and may be either discharged through pipe 45 or delivered to burner 52 for combustion of combustible constituents thereof such as unreacted hydrogen carbon monoxide, or hydrocarbons originally present therein, or carbon monoxide or other combustible gas produced by the reactions in the process.

It may be seen that in the first stage of the process, in unit A, the raw ore feed is subjected to contact with gas which has already passed through two stages and has thus lost part of its reducing power due to oxidation of part of the hydrogen, carbon monoxide, or other gaseous reducing agent. However, this gas is still capable of effecting partial reduction of the iron oxide present in the ore, so that a high degree of utilization of the reducing gas is thus obtained. In the second stage in unit B, the partially reduced ore contacts gas of somewhat greater reducing power, which effects a further reduction of the iron oxide. In unit C it is subjected to a third and final stage of treatment by contact with the fresh reducing gas and, by properly controlling the temperature and other conditions, it is thus possible to obtain substantially complete reduction of the iron to the metallic state.

From the final separating device 25 the treated product, containing the iron in reduced condition together with the gangue or other material present in the original ore, is delivered to collecting chamber 68, in which it may be partially cooled by transfer of heat through the wall thereof to the surrounding air, and thence through cooling device 69 to storage chamber 71, where it may be further cooled before being discharged from this chamber into contact with air. Thus, the product is cooled out of contact with air, to a temperature below which rapid re-oxidation of the metallic iron upon contact with air will not occur.

The temperature to which the reducing gas and suspended ore should be heated in the reduction units will depend somewhat upon the nature of the reducing gas. In general, however, this temperature should be somewhat above 1000° F., and preferably above about 1200° F. Higher temperatures may generally be used to advantage, but it is not advisable to operate at temperatures high enough to cause fusion or substantial sintering of the gangue material in the ore. I have found that in most cases temperatures between about 1300° and 1700° F. are most suitable.

While I have shown three successive reduction stages, it will of course be understood that any desired number of stages greater than one may be employed.

In order to obtain effective transfer of heat through the walls of the tubes to the gas and suspended solid material, I prefer to use tubes of relatively small diameter, for example, from about 2 to 8 inches inside diameter. The velocity of the gas must be relatively high in order to maintain the solid particles in suspension and to carry them upward in the upflow tube sections. It will be noted that the up-flow tube sections 1, 4, 13 and 18 are shown as being of somewhat smaller diameter than the down-flow sections 3, 11 and 16, and I prefer to use tubes of such diameter that the cross-sectional area of the up-flow tubes is materially less than that of the down-flow tubes, so that the gas velocity in the upward flow portion of each stage is materially greater than in the downward flow portion. For example, I may use down-flow tube section having a cross-sectional area of about two to four times that of the up-flow sections, whereby the gas velocity in the upward flow portions is about two to four times as great as in the downward flow portions.

The purpose of this difference in tube diameters and gas velocities is to provide sufficient velocity in the up-flow sections to convey the solids upward against the action of gravity, and at the same time to take advantage of the fact that a lower velocity may be used in the down-flow sections where the action of gravity assists in conveying the solids, and thus provide as long a contact time as possible in a reduction unit made of vertical tubes of a given length.

The length of the tube sections is subject to considerable variation, as is the number of successive sections of reverse flow in each reduction unit or stage, and the invention is not to be understood as limited in either of these respects. In general, however, I find it desirable to provide a gas flow path in each stage of from 30 to 75 feet in length, as represented, for example, by two sections each 15 feet long, and three sections each 25 feet long, respectively.

The following dimensions and operating conditions may be given as a specific example, using natural gas as the reducing gas in an apparatus arranged as shown in the drawing:

| | |
|---|---|
| Length of each tube section within heating chamber 53 _____ ft __ | 20 |
| Inside diameter of down-flow tube sections in each unit _____ in __ | 6 |
| Inside diameter of up-flow tube sections in each unit _____ in __ | 3½ |
| Velocity of gas flow in down-flow tube sections _____ ft./sec __ | 34 |
| Velocity of gas flow in up-flow tube sections _____ ft./sec __ | 100 |
| Temperature inside tubes _____ °F __ | 1500–1600 |

One advantage of using vertical tubes is that they are more easily supported and will better support their own weight even though the strength of the alloy steel or other material of which they are made is considerably reduced at the relatively high temperature employed. Furthermore, the use of vertical tubes eliminates or minimizes difficulties that might result from accidental interruption of gas flow during operation, for with vertical tubes the solids present in the tubes would simply fall by gravity to the bottom of the tubes if the gas flow stops, and could be easily discharged through the lower ends of the tubes upon removal of cap members 56.

The rate at which the ore is introduced in the process will depend upon other conditions, such as the composition and state of division of the ore, the temperature employed, the nature and amount of reducing gas used, and the degree of completeness of reduction desired.

As noted above, it is possible to obtain substantially complete reduction of the iron to the metallic state by proper selection and control of conditions. Although it is generally preferable to employ such conditions in order to obtain maximum recovery of metallic iron, it may in some cases be economically desirable to effect only partial reduction. For example, the process may be so operated as to effect reduction of a major portion of the iron to metallic state and the remaining portion to ferrous oxide (FeO).

The treated product discharged from chamber 71 may be subjected to any desired further treatment for separation of the reduced metallic iron from the associated gangue material.

This separation may, for example, be effected magnetically, in which case any ferrous oxide present will be separated and recovered along with the metallic iron. The particles of material in the treated product are relatively soft and friable and may, if desired, be reground before separation of the iron, in order to more effectively free the reduced iron from the associated gangue material.

I claim:

1. A process of reducing iron oxide in suspension in a reducing gas at elevated temperature which comprises: subjecting finely divided solid material containing iron oxide to a plurality of successive stages of reduction by contact with a stream of reducing gas at elevated temperature and high velocity, and transporting the solid material in suspension in the gas through each of said reduction stages, said solid material being first introduced into the gas entering the first reduction stage; separating from the gas leaving each stage suspended solid material containing the iron in a progressively increasing state of reduction; introducing the solid material separated from the gas leaving each stage other than the last into the gas entering the next succeeding stage; discharging from the process the solid material separated from the gas leaving the last stage; introducing said reducing gas first into the last reduction stage; delivering the gas from each stage other than the first, after the separation of suspended solid material therefrom, into the next preceding stage; discharging from the process the gas leaving the first stage, after the separation of suspended solid material therefrom; and supplying heat indirectly to the gas and suspended solid material in each stage.

2. A process as set forth in claim 1, in which the stream of reducing gas carrying the solid material in suspension moves vertically throughout the major portion of each reduction stage, and in which the gas moves downward in one portion of each stage and upward in another portion of each stage, the gas velocity in the upward flow portion of each stage being materially greater than in the downward flow portion of that stage.

3. A process of reducing iron oxide in suspension in a reducing gas at elevated temperature which comprises: subjecting finely divided solid material containing iron oxide to a plurality of successive stages of reduction by contact with a stream of reducing gas at elevated temperature and high velocity, and transporting the solid material in suspension in the gas through each of said reduction stages, said solid material being first introduced into the gas entering the first reduction stage; separating from the gas leaving each stage suspended solid material containing the iron in a progressively increasing state of reduction; introducing the solid material separated from the gas leaving each stage other than the last into the gas entering the next succeeding stage; discharging from the process the solid material separated from the gas leaving the last stage; supplying heat indirectly to said reducing gas prior to contact of said solid material therewith to preheat the gas; introducing the reducing gas so preheated into the last reduction stage; delivering gas from each stage other than the first, after the separation of suspended solid material therefrom, into the next preceding stage; discharging from the process the gas leaving the first stage, after the separation of suspended solid material therefrom; and supplying heat indirectly to the gas and suspended solid material in each stage.

4. An apparatus for reducing iron oxide in suspension in a reducing gas at elevated temperature, which comprises: a furnace provided with a heating chamber; a plurality of successive tubular reduction units adapted for passage therethrough of reducing gas carrying suspended solid material, said reduction units extending within said heating chamber and each provided with inlet means at one end and outlet means at the other end; each of said tubular reduction units extending vertically throughout the major portion of its length and comprising a plurality of vertically extending tubular sections connected in series to provide for passage of gas in reverse directions in successive sections, the up-flow sections being of materially less cross-sectional area than the down-flow sections; a corresponding plurality of successive separating devices each adapted to separate suspended solid material from gas, the outlet of each reduction unit being connected to the corresponding separating device to deliver gas and suspended solid material thereto; means for introducing finely divided solid material containing iron oxide into the inlet means of the first reduction unit; means for delivering separated solid material from each of said separating devices other than the last into suspension in the gas in the inlet means of the next succeeding reduction unit; means for supplying a reducing gas to the inlet means of the last reduction unit; and means for delivering gas from each of said separating devices other than the first to the inlet means of the next preceding reduction unit.

LYLE CALDWELL.